US008475020B2

(12) United States Patent
Dubosc

(10) Patent No.: US 8,475,020 B2
(45) Date of Patent: Jul. 2, 2013

(54) VEHICLE SIGNALLING DEVICE WITH A THREE-DIMENSIONAL OPTICAL EFFECT

(75) Inventor: Christophe Dubosc, Villemomble (FR)

(73) Assignee: Valeo Vision, Bobigny (FR)

( * ) Notice: Subject to any disclaimer, the term of this patent is extended or adjusted under 35 U.S.C. 154(b) by 158 days.

(21) Appl. No.: 12/966,106

(22) Filed: Dec. 13, 2010

(65) Prior Publication Data

US 2011/0149585 A1 Jun. 23, 2011

(30) Foreign Application Priority Data

Dec. 21, 2009 (FR) ...................................... 09 59286

(51) Int. Cl.
*F21V 7/00* (2006.01)
*B60Q 1/26* (2006.01)

(52) U.S. Cl.
USPC ............ 362/517; 362/540; 362/544; 362/300

(58) Field of Classification Search
USPC ................. 362/511, 514, 517, 518, 298, 300, 362/307, 346, 540, 544, 545
See application file for complete search history.

(56) References Cited

U.S. PATENT DOCUMENTS

| | | | | |
|---|---|---|---|---|
| 5,967,647 | A | 10/1999 | Eichler | |
| 7,654,689 | B2 | 2/2010 | Chang | |
| 2005/0078486 | A1 * | 4/2005 | Kawaguchi | 362/494 |
| 2008/0094842 | A1 | 4/2008 | King et al. | |
| 2008/0298072 | A1 | 12/2008 | Chang | |

FOREIGN PATENT DOCUMENTS

| | | | |
|---|---|---|---|
| DE | 19704467 | A1 | 8/1998 |
| EP | 1916471 | A1 | 4/2008 |
| FR | 2759149 | A1 | 8/1998 |

* cited by examiner

*Primary Examiner* — Thomas Sember
(74) *Attorney, Agent, or Firm* — Jacox, Meckstroth & Jenkins

(57) ABSTRACT

A light signalling device, particularly designed for motor vehicles. The device has a reflector with a reflecting surface and a screen arranged opposite the reflector and having a semi-reflecting zone. The screen being arranged away from the reflector and forming a cavity with the reflector.

The light rays of the source penetrate the cavity; and some of these rays are transmitted by the semi-reflecting zone, and others of these rays are reflected by the semi-reflecting zone, then by the reflector into the cavity in such a way as to generate a repetitive visual or three-dimensional effect of depth.

The screen is configured and arranged in relation to the direction of emission of the light source in such a way that another part of the light rays leaves the cavity at the level of the screen without meeting the semi-reflecting zone.

27 Claims, 4 Drawing Sheets

VEHICLE SIGNALLING DEVICE WITH A THREE-DIMENSIONAL OPTICAL EFFECT

CROSS-REFERENCE TO RELATED APPLICATIONS

This application claims priority to French Application No. 0959286 filed Dec. 21, 2009, which application is incorporated herein by reference and made a part hereof.

BACKGROUND OF THE INVENTION

1. Field of the Invention

The invention concerns a signalling device particularly designed for a motor vehicle. It concerns, for example, a signal light, a flashing light, arranged to the front or rear of a vehicle, or a parking light or brake light.

2. Description of the Related Art

More particularly, it concerns signalling devices which generate an effect of three-dimensional depth thanks to a particular optic device. Such a device is known by the patent document EP 1 916 471 A1, which is equivalent to U.S. Patent Publication 2008/0094872, which is incorporated herein by reference and made a part hereof. This document describes a sidelight comprising a cavity formed by a reflector and a screen arranged away from the reflector. The screen has the particular feature of being semi-reflecting, that is, some of the luminous rays that meet it are reflected, and others are transmitted. The cavity presents the particular feature that one of the surfaces of the reflector and the screen of which the cavity consists, is convex.

A series of light sources of the electroluminescence diode type is arranged at the periphery of the reflector, and directed so as to emit the light generally towards the screen. Given its semi-reflecting nature, some of the light rays are directly transmitted and some are reflected towards the reflector. The reflector then reflects these rays towards the screen with a gap directed towards the center of the reflector. These rays reflected by the reflector meet the screen again. Similarly to the light rays originating directly from the light sources, some of the rays are transmitted by the screen and some are reflected towards the reflector, and so on. These multiple partial transmissions and partial reflections result in an optical effect of depth in three dimensions.

The power of lighting or illumination of the emitted light rays decreases progressively in accordance with the reflections in the cavity. This optical effect is interesting as it enables the sidelight to be customized to draw the attention of other drivers. It also allows the sidelight to be concealed within a bodywork element, such as a bumper or a motor vehicle wing. It also allows the completion of a slim signalling device of small overall dimension with respect to the effect of depth generated. In effect, the semi-reflecting nature of the screen is obtained by applying a metallic coating which may give it a metalized appearance similar to that of a bodywork element.

The teaching of this document, however, presents one major disadvantage, that is, the treatment of the screen which is intended to make it semi-reflecting. The metallic layer applied on the screen will have the consequence that some of the rays originating from the light sources will be transmitted (without counting the losses inherent in the material of the screen). The rate of reflection and transmission may vary and will be directly dependent on the application of the metallic layer. From a point of view of procedure, it is very difficult to guarantee a rate of reflection and transmission within a narrow tolerance range. The consequence is that in the absence of a costly screen treatment procedure, the sidelight equipped with a light source of standard power risks not fulfilling the photometric conditions required by legislation for a signalling function and also risks making the left and right parking lights of the vehicle appear to be different.

SUMMARY OF THE INVENTION

The objective of the invention is to offer a signalling device which is simple and cheap to complete, while fulfilling the legal photometric requirements.

The invention consists of a luminous signalling device, particularly designed for motor vehicles, which lights up a space with a main axis of illumination comprising the following:

- a reflector with a reflecting surface, directed so as to face this space to be lit;
- a screen arranged opposite the reflector, between the reflector and the space to be lit, the screen comprising a semi-reflecting zone; the screen is arranged away from the reflector and forms a cavity with the reflector, and at least one of the surfaces of which, formed by the lens or the reflector, is convex;
- a light source support is configured so that the light rays of the source penetrate the cavity according to a main direction directed towards the space to be lit, and some of the light rays meet the semi-reflecting zone, some of these rays being transmitted by the semi-reflecting zone and others reflected by the semi-reflecting zone, then by the reflector into the cavity so as to generate a repetitive visual effect of depth; and
- these rays are a first part of the light rays emitted by the light source, the screen being configured and arranged in relation to the direction of emission of the light source so that a second part of the light rays emitted by the light source leave the cavity at the level of the screen without meeting the semi-reflecting zone.

This measure makes it possible to generate a light image with the light rays which do not meet the partially reflective and partially transparent part (that is, semi-reflecting) of the screen, suitable to assure the photometric function of the device while allowing another part (essentially the remaining part) of the light rays to undergo a clearance of partial transmission (with loss) and of partial reflection which will generate repeating images similar to the main image and of a progressively smaller size. The invention thus makes it possible to very simply produce a first light image which serves as signalling from a photometric point of view, and a series of corresponding images with three-dimensional effect which ensures that the device can be customized. The required power level of the light sources remains reasonable, and the tolerances linked to the treatment of the screen, with a view to making it semi-reflecting, may remain broad.

According to one mode of realization, 20 to 60% of the rays reaching the semi-reflecting zone are reflected.

According to one advantageous mode of one embodiment of the invention, the screen comprises an essentially transparent zone through which the second part of the light rays passes.

According to another advantageous mode of one embodiment of the invention, the transparency of the essentially transparent zone is such that at least 80% of the rays are transmitted. The essentially transparent zone reflects the rays to a lesser extent than the semi-reflecting zone. Preferably, less than 4% of the rays entering this zone are reflected.

According to yet another advantageous mode of one embodiment of the invention, the essentially transparent zone of the screen is to the right of at least some of the light rays that penetrate the cavity. It concerns the simplest construction of the invention, a priori.

According to yet another advantageous mode of one embodiment of the invention, the screen comprises a partially reflecting coating over at least one of its surfaces, while the essentially transparent zone of the screen does not have the coating. This measure is actually fairly simple to put into effect. One privileged mode is a procedure consisting of masking the non-metalized part of the screen before metallization. Preferably, the metallization takes place by evaporation under vacuum.

Another advantageous mode of realization consists of applying a coating to the screen and to then remove this coating on the part which is intended to be transparent, preferably by applying a laser ray.

According to yet another advantageous mode of one embodiment of the invention, the screen is configured so that it does not extend to the right of at least some of the light rays which penetrate the cavity. In this case, the screen is of smaller size. Such a design may be found to be even simpler, and less costly.

According to yet another advantageous mode of one embodiment of the invention, the light rays that penetrate the cavity are spread around a surface in such a way that the part of the light rays which is partially reflected and transmitted by the screen and reflected by the reflector in the cavity, is generally reflected towards the center of the surface.

According to yet another advantageous mode of one embodiment of the invention, the device comprises at least one light guide suitable to transmit the second part of the light rays of one or more light sources through at least some of the cavity, and in such a way as to pass outside the cavity at the level of the screen outside the semi-reflecting zone. The use of a light guide gives a certain freedom and flexibility in terms of dimensioning the device.

According to yet another advantageous mode of one embodiment of the invention, the light guide comprises a part in the general shape of a loop, preferably closed, which is intended to be arranged around the reflector.

According to yet another advantageous mode of one embodiment of the invention, the support of the light source is away from the cavity, and the device comprises means of guiding the light rays emitted by the light source as far as the cavity.

According to yet another advantageous mode of one embodiment of the invention, the device is a vehicle signalling device, the configuration of the screen and light sources being completed so that the second part of the light rays makes it possible to satisfy the photometry conditions required for the completion of a motor vehicle signalling function.

These and other objects and advantages of the invention will be apparent from the following description, the accompanying drawings and the appended claims.

BRIEF DESCRIPTION OF THE ACCOMPANYING DRAWINGS

Other characteristics and advantages of the present invention will be better understood with the aid of the description and drawings, which include the following:

DETAILED DESCRIPTION OF THE PREFERRED EMBODIMENTS

Different modes of realization are illustrated in the figures of this application, which will be described hereafter. These illustrations are diagrammatic, and deliberately simplified for reasons of clarity in setting out various embodiments of the invention.

Figure 1:
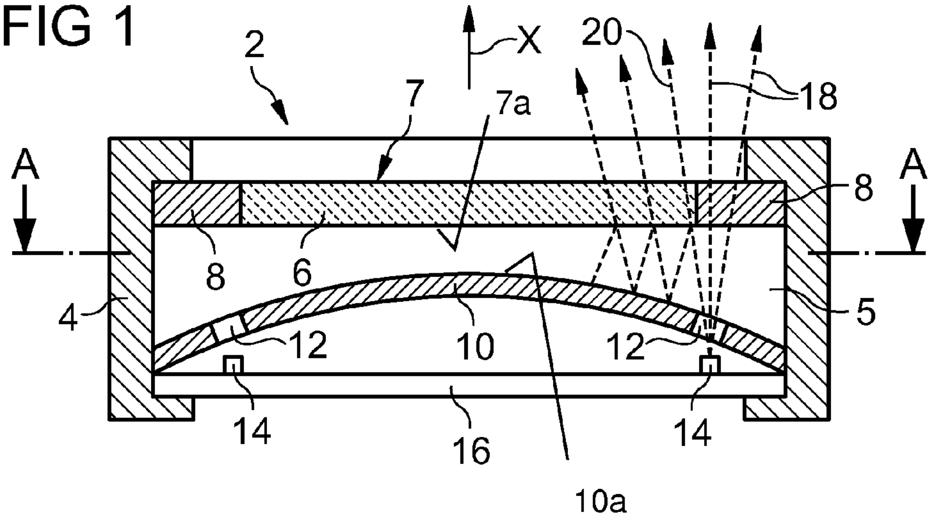
FIG. 1 is a diagrammatic representation in section of a signalling device according to a first mode of realization of the invention.

A signalling device 2 according to a first mode of realization of the invention is illustrated in FIG. 1. Signalling device 2 is intended to emit a beam of light according to a direction X towards a space arranged above the device. This expression "above" is linked to the orientation of the device on FIG. 1, and is to be interpreted relatively as it depends on the orientation of the device when in operation. In practice, the device is generally fitted so as to emit its beam of light according to a generally horizontal direction directed to a front or a rear of a vehicle in accordance with the assembly of the device at the front or rear, respectively, of the vehicle. However, it should be noted that other orientations may be envisaged according to the signalling function of the device. This remark holds true for the different modes of realization illustrated.

The signalling device 2 comprises a housing 4 which itself comprises a support 16 for a series of localized light sources 14. These localized light sources 14 may be of the electroluminescence diode type or any other known type of light source. These localized light sources 14 are spread over support 16 so as to form a general rectangular shape. They are arranged so that their main axis of lighting is oriented approximately according to the direction illustrated by the arrow of FIG. 1, that is, the main direction of lighting.

The signalling device 2 also comprises a reflector 10 arranged above support 16, or even between support 16 and the space towards which the device emits its beam of light. The reflector 10 comprises a series of orifices 12, arranged to the right of the localized light sources 14 according to their main axis of lighting. The reflector 10 presents a reflecting surface 10*a* directed towards the space to be lit.

The signalling device 2 also comprises a screen 7 arranged above (according to the orientation of FIG. 1) reflector 10, or even between reflector 10 and the space to be lit, at a certain distance from the reflector 10. Screen 7 and reflector 10 form a cavity 5, essentially marked out by the reflecting surface 10*a* of reflector 10 and an interior surface 7*a* of screen 7. This interior surface 7$a$ is generally flat in this mode of realization. The screen 7 comprises a central semi-reflecting part 6 and a transparent part or transparent peripheral part 8.

Some of the light rays emitted by the localized light sources 14 are transmitted directly towards the space to be lit by this transparent part 8 of screen 7 and another part, essentially the remaining part, is partially reflected by the semi-reflecting part 6 of screen 7 arranged close to the transparent part 8 of the screen 7. The reflected part then meets the reflecting surface 10$a$ of reflector 10 and is thus practically totally reflected; some of these reflected rays will then be transmitted, and others will be again reflected by the semi-reflecting part 6 of the screen 7, and so on. This mechanism means that the rays transmitted by the transparent part 8 undergo very little, indeed no, loss. The part of the rays that undergoes the clearance of partial reflection and transmission will generate an optical effect of depth.

This optical mechanism is illustrated in FIG. 1, from the light source of the right side. The light rays emitted directly by the light source cross the screen 7 with very little loss. They are illustrated by the dotted lines with reference 18. Among the beam of light rays emitted directly by the light source 14, some of these rays meet the semi-reflecting part 6 of the screen 7. For example, the screen 7 reflects towards the reflector 10 some of the light rays 20 meeting the semi-reflecting part 6, preferably more than 4% of the rays meeting this surface. The reflecting surface 10$a$ then totally or almost totally reflects this reflected part towards the screen 7. Some of these rays, as for the previous rays, will be transmitted by the semi-reflecting screen 6 and others will again be reflected towards the reflector 10. This clearance of reflection and shift towards the center of the cavity is assured by the convex nature of the reflector 10. It should be noted that as an alternative, the surface 10$a$ of the reflector 10 could be generally flat, and the interior surface 7$a$ of the screen 7 marking out the cavity would then be convex. It is also possible to envisage considering a combination of convex surfaces at the level of the screen 7 and the reflector 10.

Figure 2:
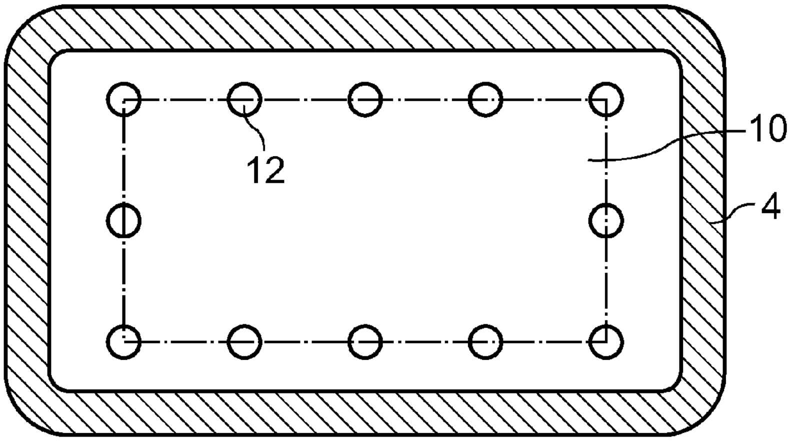
FIG. 2 is a section view according to axis A-A of FIG. 1.

Reflector 10 is illustrated in FIG. 2, which is a section view according to axis A-A of FIG. 1. One may observe there the series of orifices 12 arranged according to a contour generally corresponding with a rectangle. The light sources 14, in this example of electroluminescent diodes, are to the right of these orifices 12.

Figure 3:
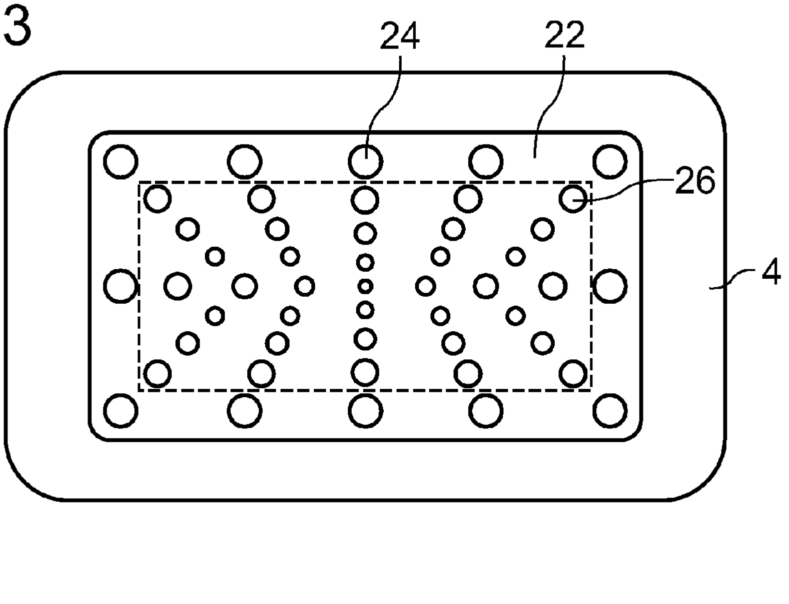
FIG. 3 is a view in elevation of the device of FIG. 1 when it is live, illustrating the appearance of this signalling device when lit, and the associated optical effect.

FIG. 3, which is a view in elevation of the device in operation, illustrates the image of the rays emitted by the signalling device. The rays transmitted directly by the transparent part of the screen 7 form points 24 according to an exterior contour (marked by the dotted lines in the FIG. 3). These rays serve the signalling function of the device from a photometric point of view. In effect, they originate directly from an important part, preferably more than 50%, of the rays emitted by the light sources, and are transmitted with hardly any loss. The rays transmitted by the semi-reflecting part 6 form similar but smaller points of geometry and are repeated towards the center of the device. These rays assure the visual appearance and thus the signature function of the device, giving it its individual character. The level of lighting assured by this part is significantly lower due to the semi-reflecting nature of the lens through which they pass.

The more one approaches the center of the device, the more the rays have undergone multiple reflections between the screen 7 and the reflector 10 before leaving the screen 7. Their quantity is likewise less. It follows that the appearance produced by the peripheral contour of the screen 7, here a set of points 24 arranged in a circle, is repeated several times while approaching the center, but with an intensity and size which decreases towards the center, thus giving an illusion of depth of the device. Each repetition 26 is to the image of the appearance of the zone that generates the optical function, in this case points 24. This also makes it possible to reinforce the possibility of perceiving the signal sent. Other drivers will therefore react faster to the signal sent.

The screen 7 may be completed with a currently used transparent material, such as, for example, certain plastics or glass. One of its surfaces, the exterior or interior surfaces, is made semi-reflecting by applying a typically partially reflecting coating. The coating is normally a metallic coating such as aluminum or a stainless metal applied by the technique of application in vapor phase and under vacuum. Different methods of application of the coating known by the professional may be used. The rate of reflection of the coating is, for example, between 20% and 60%. The transparent part 8 of the screen 7 is not coated.

One privileged mode for forming the transparent part of the screen 7 is to arrange to locally remove the coating previously applied on the screen 7, by applying a laser ray.

Figure 4:
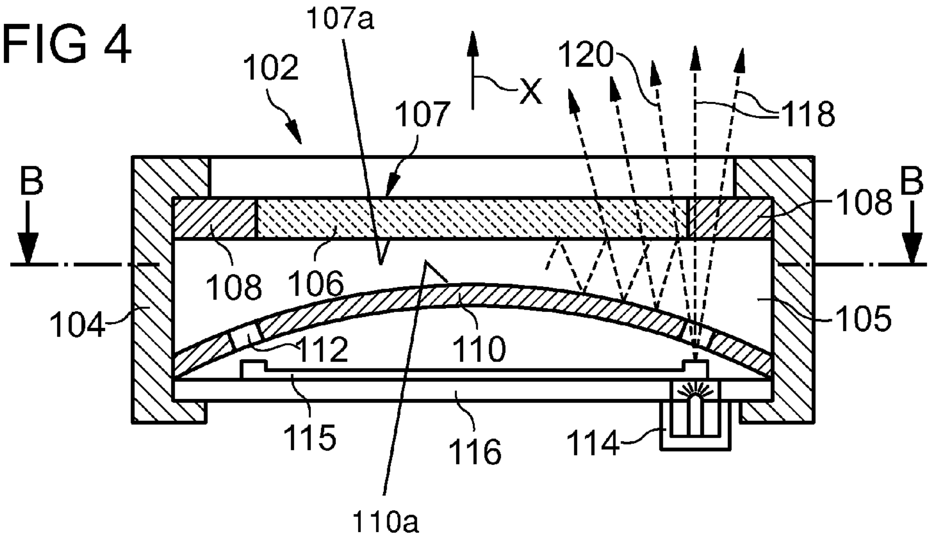
FIG. 4 is a diagrammatic representation in section of a signalling device according to a second mode of realization of the invention.
Figure 5:
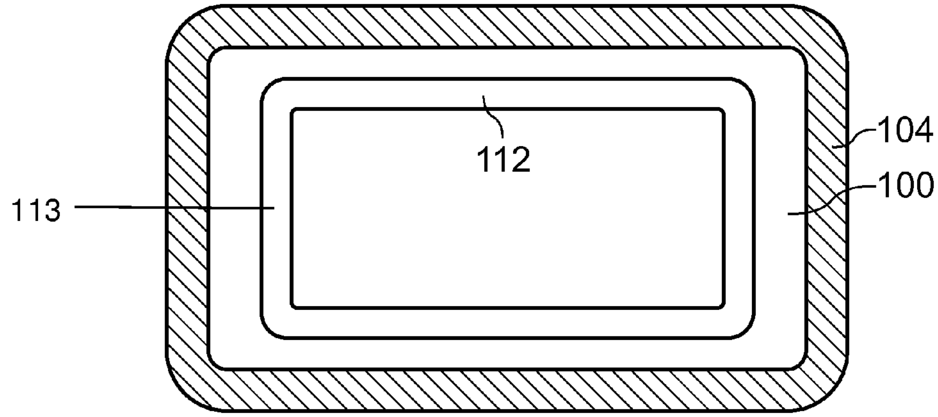
FIG. 5 is a view in section according to axis B-B of FIG. 4.
Figure 6:
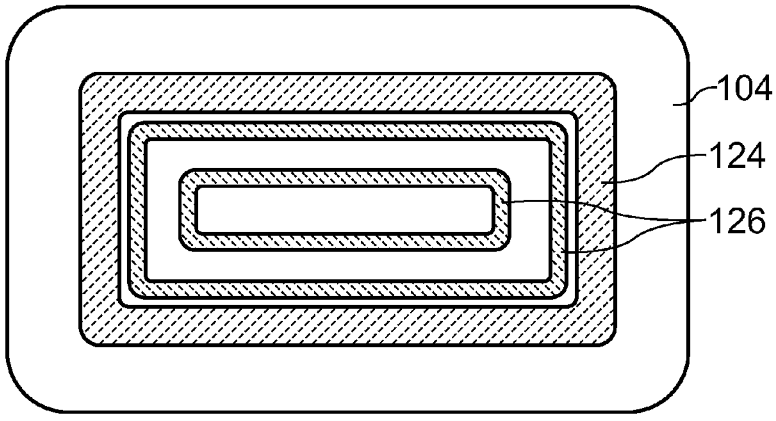
FIG. 6 is a view in elevation of the device of FIG. 4 when it is live, illustrating the appearance of this signalling device when lit, and the associated optical effect.

A second mode of realization of the invention is illustrated in FIGS. 4 to 6. It differs from the first mode essentially in so far as a light guide 115 is used instead of and in place of the series of light sources of the first mode of realization. A light source 114 is arranged close to the light guide 115 so as to feed it with light rays. A single light source 114 has been represented for reasons of simplicity in setting out the invention. It is clear, however, that it may be envisaged to use several light sources 114 in accordance with various parameters of dimensioning of the device. One or more light sources 114 may be of different types: electroluminescence diode, classical incandescence lamp etc. The light guide 115 presents a diffusion ring arranged opposite a corresponding opening ring 112 made in reflector 110. The light guide 115 will then emit the light rays originating from light source 114 in the cavity 105 in the direction of screen 107.

The opening in the shape of a ring 113 at the level of reflector 100 is easily visible in FIG. 5, which is a section view according to axis B-B of FIG. 4.

The optical phenomena are similar to those of the first mode of realization, unlike the image produced. The image of lighting of the device is illustrated in FIG. 6, which is a view in elevation of the device of FIG. 4 when the latter is in operation. One may observe that the light rays originating directly from the light guide 115 form a continuous contour 124 of a power level of lighting or illumination suitable to assure the photometric function of the device. This image 124 is reproduced several times by the contours 126 which become gradually smaller as they approach the center of the device. These images 126 assure the function of signature or individuality of the device.

Figure 7:
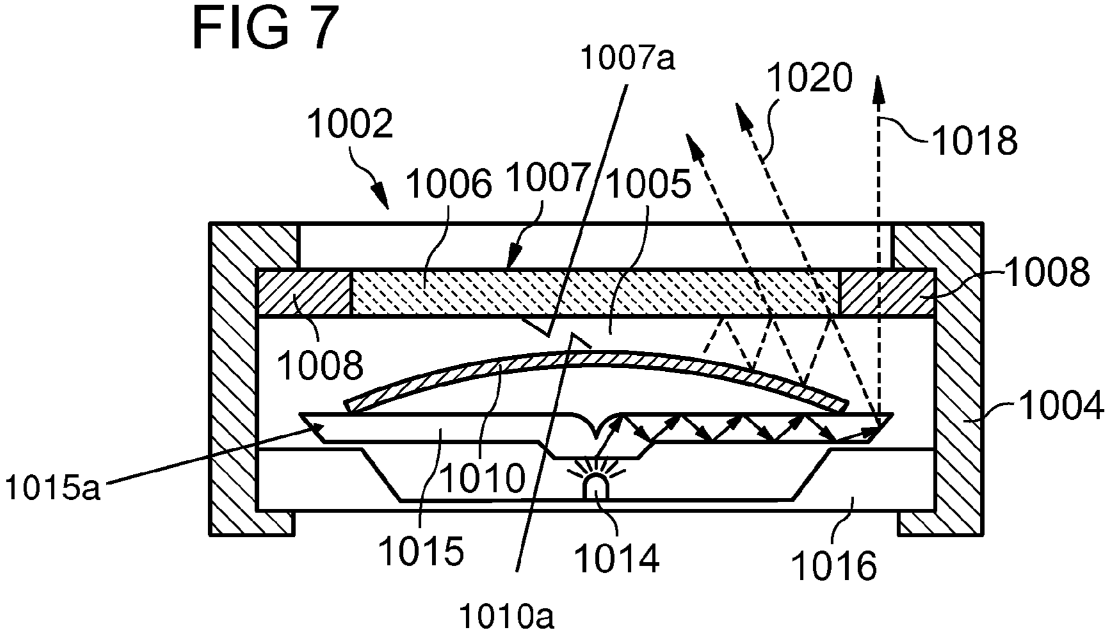
FIG. 7 is a diagrammatic representation in section of a signalling device according to a third mode of realization of the invention.
Figure 8:
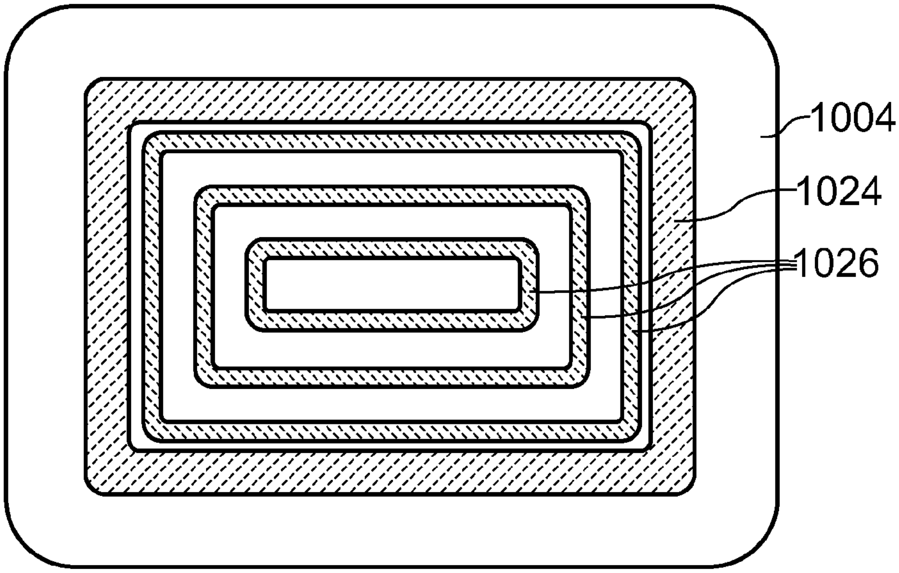
FIG. 8 is a view in elevation of the device of FIG. 1 when it is live, illustrating the appearance of this signalling device when lit, and the associated optical effect.

A third mode of realization is illustrated in FIGS. 7 and 8. It differs from the second mode of realization essentially in so far as a light guide 1015 is configured so as to exceed or extend beyond the edge boundary of the reflector 1010 and present bevelled terminal surfaces. The light of light source 1014 enters the light guide 1015 by its lower side. As the guide 1015 presents a conical depression on its upper side pointing downwards, the rays are reflected laterally in the thickness of the guide 1015 and are propagated by interior reflection, up to a terminal bevelled surface 1015$a$. By reflection on the bevelled surface 1015$a$, the rays are sent towards the cavity 1005 and leave the light guide 1015. The latter does not present any further orifice or opening but is simply arranged on the light guide 1015. The latter assure the transmission of the light originating from one or more light sources 1014 towards the cavity 1005. The light source or sources

1014 may be arranged away from cavity 1005 in so far as the light guide 1015 assures the transmission of the light rays towards the cavity 1005.

The optical phenomena are identical to those of the second mode of realization. The image of lighting is similar to that of the second mode of realization. One observes that the device according to the invention makes it possible to generate different shapes of image.

Figure 9:
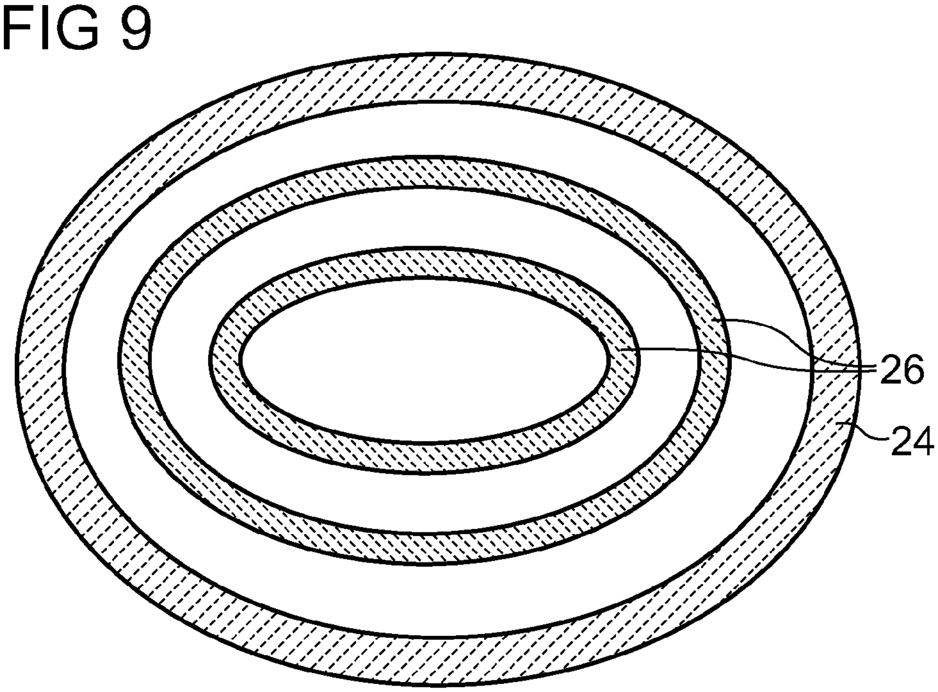
FIG. 9 illustrates a second alternative form of the appearance of this signalling device when lit, and the associated optical effect.
Figure 10:
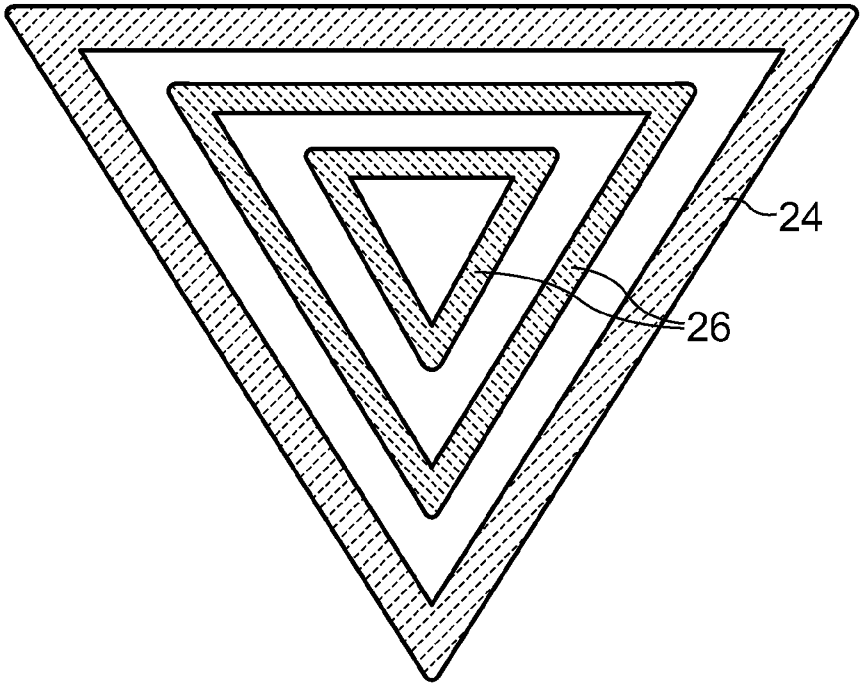
FIG. 10 illustrates a third alternative shape of the appearance of this signalling device when lit, and the associated optical effect.

Again according to the principle of the invention, possible images are illustrated in FIGS. 9 and 10. As in the other modes of realization, the exterior contour 24 is of a lighting power level significantly greater than that of the interior contours 26. Thus, the arrangement of the light sources and/or of the optic guide and screen were completed in order to generate an ovoid appearance which repeats towards the center (FIG. 9), and a triangular appearance repeating towards the center (FIG. 10).

In the different modes of realization illustrated, the shape of signals 24, 124 and 1024 is repeated several times as they approach the center, but with an intensity and size which gradually decrease towards the center, thus giving an illusion of depth of the device. Each repetition 26, 126, 1026 is at the image of the appearance of the zone generating the shape of signals 24, 124 and 1024, thus also making it possible to reinforce the possibility of perceiving the signal sent.

According to one variant of realization, this signalling device may be a brake light. Advantageously, the device may be completed so that the light intensity of the sources is in proportion to the intensity of braking. In this case, according to the intensity of braking, there will be a more or less high quantity of multiple reflections. Thus, the greater the braking, the more the signal patterns will be repeated towards the center and the deeper will be the repetition of the signal. The braking information is thus better transmitted to other drivers.

This device may also be a parking light or a flashing light.

Generally speaking, it should be noted that it is quite possible to envisage replacing the transparent part of the screen by an absence of material in order to assure transmission with a minimum of loss. In any event, the principle of the invention will function similarly with an absence of material of the screen to the right of the light rays that penetrate the cavity. Similarly, it is quite possible to envisage arranging a transparent material, different to that of the screen, to the right of the light rays that penetrate the cavity.

Generally speaking, it is similarly to be remarked that different types of light guide may be commissioned in order to lead the light rays from one or more light sources towards the cavity. The second and third modes of realization are purely by way of example, and there are numerous possible variants.

Generally speaking, it should also be noted that the light rays that penetrate the cavity do not necessarily form a continuous contour, nor a closed contour. In effect, localized beams, or beams concentrated at a certain point of a contour, make it possible to obtain the combination of effects according to the invention. By way of example, the contour could be opened in a U shape. It could also consist of a series of points of stronger luminosity linked by a continuous contour of lower lighting strength.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A luminous signalling device, particularly for motor vehicles, suitable to light a space with a main lighting axis, comprising the following:

a reflector with a reflecting surface directed so as to face said space to be lit;

a screen arranged opposite said reflector, between said reflector and said space to be lit, the screen comprising a semi-reflecting zone;

said screen is arranged away from said reflector and forming a cavity with said reflector;

at least one of the surfaces formed by said screen or said reflector is convex;

a support of light source configured so that light rays of said light source penetrate said cavity according to a main direction directed towards said space to be lit, and some of said light rays meet said semi-reflecting zone; some of these rays are transmitted by said semi-reflecting zone and others of these rays are reflected by said semi-reflecting zone, then by said reflector into said cavity, in such a way as to generate a repetitive visual effect of depth;

wherein said rays are a first part of the light rays emitted by said light source; said screen is configured and arranged in relation to the direction of emission of the light source, so that a second part of the light rays emitted by the light source leaves the cavity at a level of said screen without meeting the semi-reflecting zone.

2. The luminous signalling device according to claim 1, wherein the screen comprises an essentially transparent zone through which the second part of the light rays passes.

3. The luminous signalling device according to claim 2, wherein the transparency of the essentially transparent zone is such that less than 4% of the rays reaching this zone are reflected.

4. The luminous signalling device according to claim 3, wherein the essentially transparent zone of the screen is to the right of at least some of the light rays that penetrate the cavity.

5. The luminous signalling device according to claim 3, the screen comprises a partially reflecting coating on at least one of its surfaces, the essentially transparent zone of said screen being without said coating.

6. The luminous signalling device according to claim 2, wherein the essentially transparent zone of the screen is to the right of at least some of the light rays that penetrate the cavity.

7. The luminous signalling device according to claim 6, the screen comprises a partially reflecting coating on at least one of its surfaces, the essentially transparent zone of said screen being without said coating.

8. The luminous signalling device according to claim 2, the screen comprises a partially reflecting coating on at least one of its surfaces, the essentially transparent zone of said screen being without said coating.

9. The luminous signalling device according to claim 2, wherein the essentially transparent zone of the screen is to the right of at least some of the light rays that penetrate the cavity.

10. The luminous signalling device according to claim 2, wherein the light source support is away from the cavity and the device comprises means of guiding the light rays emitted by the light source as far as the cavity.

11. The luminous signalling device according to claim 2, wherein it is a vehicle signalling device, the configuration of the screen and light sources being completed in such a way that said second part of the light rays makes it possible to satisfy the photometry conditions required for the realization of a motor vehicle signalling function.

12. The luminous signalling device according to claim 1, wherein the screen is configured so as not to extend to the right of at least some of the light rays that penetrate the cavity.

13. The luminous signalling device according to claim 12, wherein the light rays that penetrate the cavity are spread around a surface in such a way that the part of said light rays which is partially reflected and transmitted by said screen, and reflected by said reflector in said cavity, is generally reflected towards a center of the surface.

14. The luminous signalling device according to claim 1, wherein the light rays that penetrate the cavity are spread around a surface in such a way that the part of said light rays which is partially reflected and transmitted by said screen, and reflected by said reflector in said cavity, is generally reflected towards a center of the surface.

15. The luminous signalling device according to claim 14, wherein it comprises at least one light guide, suitable to transmit the second part of the light rays of one or more light sources through at least one part of the cavity, and in such a way as to pass to the height of the screen outside said semi-reflecting zone.

16. The luminous signalling device according to claim 15, wherein the at least one light guide comprises a part generally shaped like a loop, preferably closed, intended to be arranged around the reflector.

17. The luminous signalling device according to claim 1, wherein the light source support is away from the cavity and the device comprises means of guiding the light rays emitted by the light source as far as the cavity.

18. The luminous signalling device according to claim 1, wherein it is a vehicle signalling device, the configuration of the screen and light sources being completed in such a way that said second part of the light rays makes it possible to satisfy the photometry conditions required for the realization of a motor vehicle signalling function.

19. A luminous device, particularly for motor vehicles, suitable to light a space with a main lighting axis, comprising the following:

a reflector with a reflecting surface directed so as to face said space;

a screen arranged opposite said reflector, between said reflector and said space, said screen comprising a semi-reflecting zone and a transparent zone, said screen being arranged away from said reflector and forming a cavity with said reflector;

a light source; and said screen being adapted so that light rays of said light source meet said screen with first ones of these rays being transmitted by said transparent zone without reflection and in a predetermined pattern of light and second ones of these rays being reflected by said semi-reflecting zone towards said reflector and then back to said semi-reflecting zone in such a way as to generate at least one subsequent pattern of light that is subsequently the same as said predetermined pattern of light but smaller in order to give a repetitive visual effect of depth.

20. The luminous device according to claim 19, wherein the screen comprises an essentially transparent zone through which a second part of the light rays pass.

21. The luminous device according to claim 19, wherein the light rays that penetrate the cavity are spread around a surface in such a way that the part of said first ones of the light rays which are partially reflected and transmitted by said screen, and reflected by said reflector in said cavity, are generally reflected towards a center of the reflecting surface.

22. The luminous device according to claim 19, wherein the light source is situated away from the cavity and the device comprises means of guiding the light rays emitted by the light source as far as the cavity.

23. The luminous device according to claim 19, wherein it is a vehicle signalling device, the configuration of the screen and light source being completed in such a way that a second part of the light rays makes it possible to satisfy the photometry conditions required for the realization of a motor vehicle signalling function.

24. The luminous device according to claim 19, wherein said at least one subsequent pattern of light comprises a plurality of patterns having a common geometric shape and concentric with said predetermined pattern of light, but that get progressively smaller as the plurality of patterns converge toward said axis, thereby providing said visual effect.

25. The luminous device according to claim 24, wherein said plurality of patterns get progressively smaller as they converge toward said axis and an intensity of light beams for each of said plurality of patterns becomes less as said plurality of patterns converge toward said axis.

26. The luminous device according to claim 24, wherein said plurality of patterns define a plurality of concentric geometric shapes that get smaller as they converge toward said axis, with each smaller geometric shape being visually within a boundary of each and every larger geometric shape.

27. A luminous device, particularly for motor vehicles, suitable to light a space with a main lighting axis, comprising the following:

a reflector with a reflecting surface directed so as to face said space;

a screen arranged opposite said reflector, between said reflector and said space, said screen comprising a semi-reflecting zone and being arranged away from said reflector and forming a cavity with said reflector;

a light source; and at least one said screen or said reflector being adapted so that light rays of said light source meet said semi-reflecting zone with first ones of these rays being transmitted by said semi-reflecting zone in a predetermined pattern of light and second ones of these rays being reflected by said semi-reflecting zone towards said reflector and then back to said semi-reflecting zone in such a way as to generate at least one subsequent pattern of light that is repetitive visual effect of depth;

wherein the screen is configured so as not to extend to the right of at least some of the light rays that penetrate the cavity.

* * * * *